United States Patent
Fludger

(10) Patent No.: US 12,381,648 B2
(45) Date of Patent: Aug. 5, 2025

(54) PROBABILISTIC CONSTELLATION SHAPING FOR POINT-TO-MULTIPOINT OPTICAL FIBER COMMUNICATION SYSTEMS EMPLOYING SUBCARRIERS

(71) Applicant: Infinera Corporation, San Jose, CA (US)

(72) Inventor: Christopher R. Fludger, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/979,738

(22) Filed: Nov. 2, 2022

(65) Prior Publication Data
US 2023/0132851 A1 May 4, 2023

Related U.S. Application Data

(60) Provisional application No. 63/275,050, filed on Nov. 3, 2021.

(51) Int. Cl.
*H04J 14/02* (2006.01)
(52) U.S. Cl.
CPC ............... *H04J 14/0298* (2013.01)
(58) Field of Classification Search
CPC .................................. H04J 14/0298
USPC .......................................... 398/76
See application file for complete search history.

(56) References Cited

U.S. PATENT DOCUMENTS

| | | | | |
|---|---|---|---|---|
| 10,587,358 | B1 * | 3/2020 | Ebrahimzad | H04B 10/541 |
| 11,012,187 | B1 * | 5/2021 | Kim | H04L 1/0047 |
| 2012/0128347 | A1 * | 5/2012 | Sakamoto | H04J 14/021 |
| | | | | 398/48 |
| 2019/0149239 | A1 * | 5/2019 | Tehrani | G06F 17/18 |
| | | | | 398/183 |
| 2019/0149389 | A1 * | 5/2019 | Torbatian | H04B 10/541 |
| | | | | 375/298 |

* cited by examiner

*Primary Examiner* — Dalzid E Singh

(57) ABSTRACT

Consistent with the present disclosure, a transmitter is provided in a hub node of a point-to-multi-point optical communication system. The transmitter supplies a plurality or group of optical subcarriers, each subgroup of the group of optical subcarriers in, one example, is associated with a respective leaf node. Since the leaf nodes may be located at different distances from the hub node, the modulation of each optical subcarrier subgroup is optimized for the distance and impairments associated with the optical path over which the subcarrier subgroup is transmitted to its designated leaf. Namely, probabilistic shaping is employed, in one example, to adjust the modulation so that a maximum spectral efficiency is supported for a given SNR associated with the hub-leaf link.

8 Claims, 15 Drawing Sheets

PROBABILISTIC CONSTELLATION SHAPING FOR POINT-TO-MULTIPOINT OPTICAL FIBER COMMUNICATION SYSTEMS EMPLOYING SUBCARRIERS

The present patent application hereby claims priority to the provisional patent application identified by U.S. Ser. No. 63/275,050 filed on Nov. 3, 2021 the entire content of which is hereby incorporated by reference.

BACKGROUND

So-called point-to-multi-point optical communication systems typically include a hub or primary node that communicates with a plurality of leaf nodes that are remote from the hub node. The leaf nodes, however, in some systems may not be equidistant to the hub node. Rather, the leaf nodes may be located at different distances from the hub node.

The noise associated with each leaf transmission path is, in many instances, Gaussian in nature, and such noise has been termed additive white Gaussian noise (AWGN) in a linear power limited regime. Optimal capacity for optical signals propagating in an AWGN channel has been achieved with Gaussian probability distributions in which transmission probability of symbols (and their corresponding constellation points) correspond to a Gaussian distribution. Such Gaussian probability distributions are not uniform and are therefore different from the uniform distribution that normally exists on "standard" modulation formats, such as quadrature phase shift keying ("QPSK") and m-quadrature amplitude modulation ("QAM", where m is typically an integer greater than 4).

For a given optical fiber path distance between the leaf and the hub, and at a desired signal-to-noise (SNR) margin, there is an optimal spectral efficiency SE for which the transmission rate is maximized. Typically, however, such optimal SE cannot be achieved with the standard modulation formats noted above, because the fixed SEs with coarse granularities associated with such modulation formats may either be too high or too low for the link. Thus, the deployed transmission data rate on each of the hub-leaf links is often less than what the link ideally can carry.

SUMMARY

Consistent with an aspect of the present disclosure, an apparatus is provided that comprises a hub node operable to transmit a plurality of optical subcarriers, a first one of the plurality of optical subcarriers carrying first symbols and second symbols. The first symbols are transmitted with a first probability and the second symbols are transmitted with a second probability less than the first probability. A second one of the plurality of optical subcarriers carries third and fourth symbols, the third symbol being transmitted with a third probability and the fourth symbol us transmitted with a fourth probability less than the third probability. In addition, the apparatus includes a first leaf node operable to receive the first one of the plurality of optical subcarriers. Further, the apparatus includes a second leaf node operable to receive the second one of the plurality of optical subcarriers. The first leaf node is configured to be located a first distance from the hub node and the second leaf node is configured to be located a second distance from the hub node, the first distance being greater than the second distance.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) and together with the description, serve to explain the principles of the invention.

DESCRIPTION OF THE EMBODIMENTS

Consistent with the present disclosure, a transmitter is provided in a hub node of a point-to-multi-point optical communication system. The transmitter supplies a plurality or group of optical subcarriers, each subgroup of the group of optical subcarriers in, one example, is associated with a respective leaf node. Since the leaf nodes may be located at different distances from the hub node, the modulation of each optical subcarrier subgroup is optimized for the distance and impairments associated with the optical path over which the subcarrier subgroup is transmitted to its designated leaf. Namely, probabilistic shaping is employed, in one example, to adjust the modulation so that a maximum spectral efficiency is supported for a given SNR associated with the hub-leaf link.

In addition, optical subcarriers may be selectively blocked or transmitted so that the bandwidth or spectral width associated with a particular group or subgroup of optical subcarriers is within the passband of a wavelength selective switch (WSS), such that each optical subcarrier in the group or subgroup of optical carriers may be switched to a particular output of the WSS, and, in one example, directed to a particular leaf node.

Reference will now be made in detail to the present embodiments of the present disclosure, examples of which are illustrated in the accompanying drawings. In general, the same reference numbers will be used throughout the drawings to refer to the same or like parts. The terms "hub," "hub node," and "primary node" are used interchangeably herein. In addition, the terms "leaf," "leaf node," and "secondary node" are used interchangeably herein.

Figure 1:
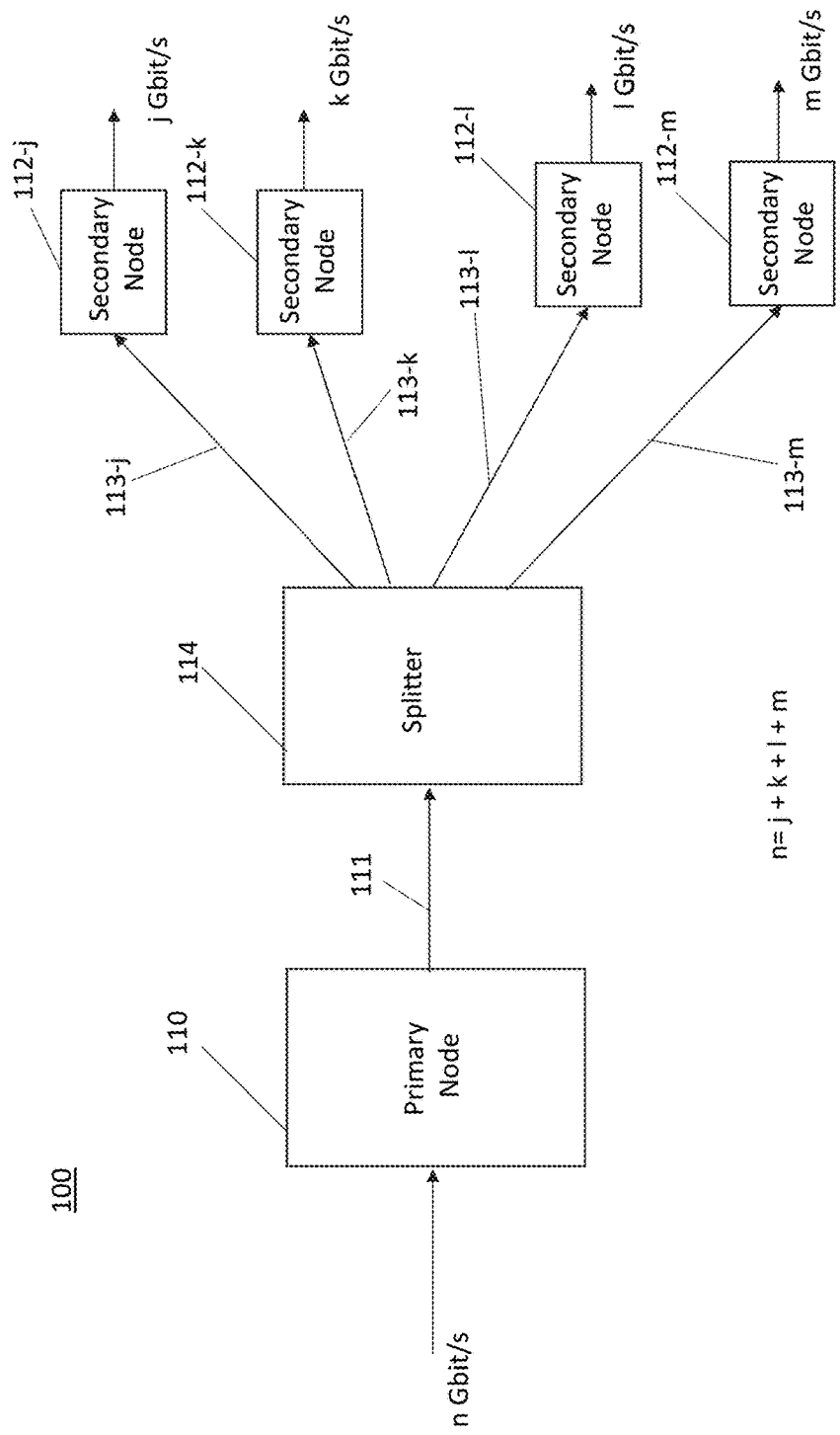
FIG. 1 shows an example of a network consistent with an aspect of the present disclosure.

FIG. 1 illustrates an example of an aggregation network 100 consistent with the present disclosure in which primary node 110 may communicate with multiple secondary nodes 112-$j$ to 112-$m$, which sometimes may be referred to individually or collectively as secondary node(s) 112. Secondary nodes 112, in one example, are remote from primary node 110. Primary node 110 may transmit a group of optical subcarriers, including subgroups of optical subcarriers described in greater detail below, in a downstream direction onto an optical communication path 111, which, like each of optical communication paths 113-$j$ to 113-$m$, may include one or more segments of optical fiber, as well as one or more optical amplifiers, reconfigurable add-drop multiplexers (ROADMs) or other optical fiber communication equipment. In the example shown in FIG. 1, splitter 114 may be coupled to an end of optical communication path 111 to receive the optical subcarriers and provide a power split portion of each subcarrier to a corresponding one of secondary nodes 112-$j$ to 112-$m$ via a respective one of optical communication paths 113-$j$ to 113-$m$.

As further shown in FIG. 1, primary node 110 has a data capacity to receive n Gbit/s of data (e.g., a data stream) for transmission to secondary node 112. Each secondary node 112 may receive and output to a user or customer a portion of the data input to primary node 110. In this example, secondary nodes 112-$j$, 112-$k$, 112-$l$, and 112-$m$ output j Gbit/s, k Gbit/s, l Gbit/s, and m Gbit/s of data (data streams), respectively, whereby the sum of the j, k, l, and m may equal n (where j, k, l, m, and n are positive numbers).

Figure 2:
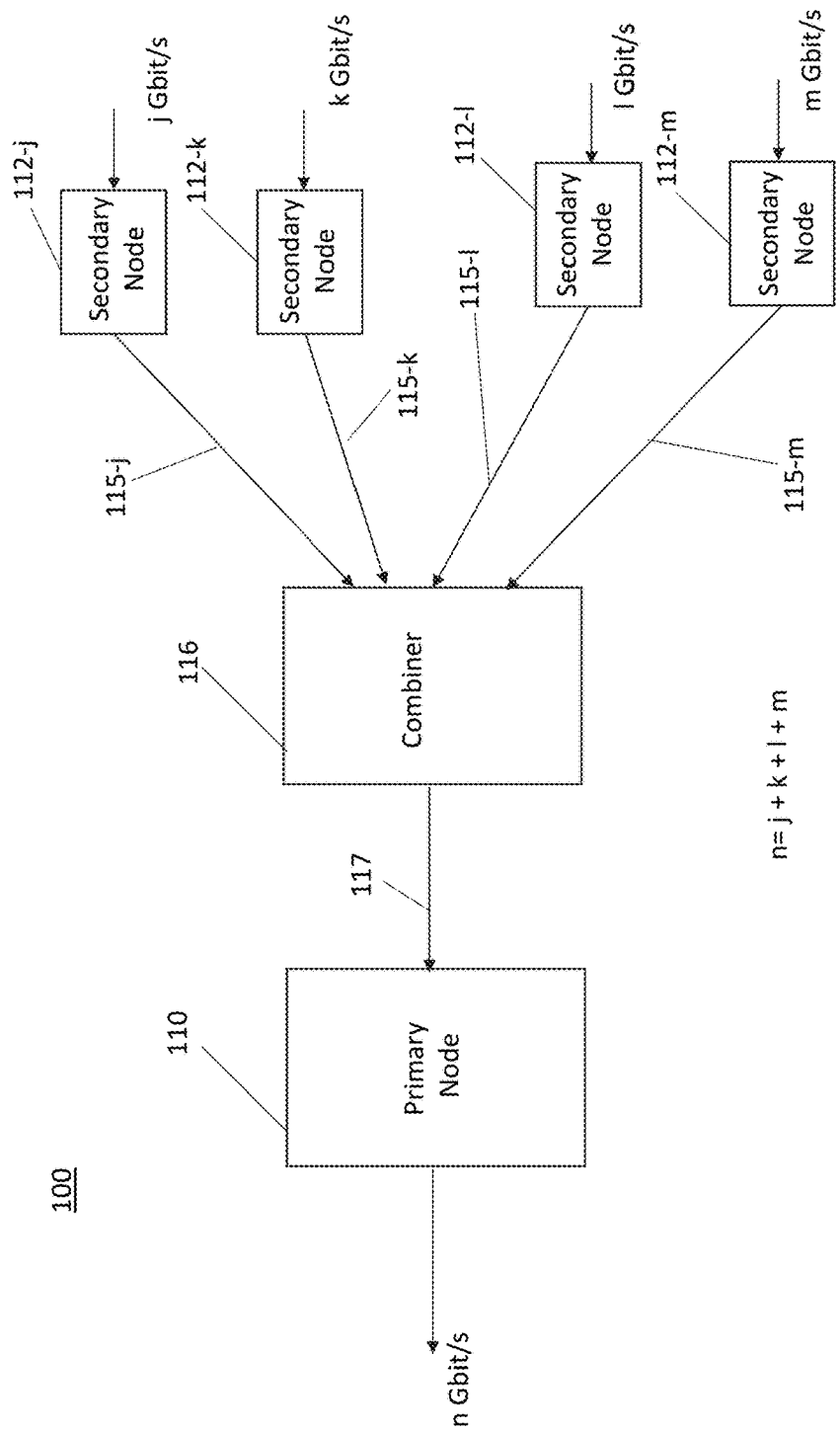
FIG. 2 shows a further example of a network consistent with the present disclosure.

FIG. 2 show transmission of additional subcarriers in an upstream direction from secondary nodes 112-$j$ to 112-$m$ to primary node 110. As further shown in FIG. 2, each of secondary nodes 112-$j$ to 112-$m$ may transmit a corresponding group of subcarriers or one subcarrier to optical combiner 116 via a respective one of optical communication paths 115-1 to 115-$m$. Optical combiner 116 may, in turn, combine the received optical subcarriers from secondary nodes 112-$j$ to 112-$m$ onto optical communication path 117. Optical communication paths 115-1 to 115-$m$ and 117 may have a similar construction as optical communication paths 111 and 112-1 to 112-$m$.

As further shown in FIG. 2, each of secondary nodes 112-$j$ to 112-$m$ receives a respective data stream having a corresponding data rate of j Gbit/s, k Gbit/s, l Gbit/s, and m Gbit/s. At primary node 110, data contained in these streams may be output such that the aggregate data supplied by primary node 110 is n Gbit/s, such that, as noted above, n may equal the sum of j, k, l, and m.

In another example, subcarriers may be transmitted in both an upstream and downstream direction over the same optical communication path. In particular, selected subcarriers may be transmitted in the downstream direction from primary node 110 to secondary nodes 112, and other subcarriers may be transmitted in the upstream direction from secondary nodes 112 to primary node 110.

In some implementations, network 100 may include additional primary and/or secondary nodes and optical communication paths, fewer primary and/or secondary nodes and optical communication paths, or may have a configuration different from that described above. For example, network 100 may have a mesh configuration or a point-to-point configuration.

Figure 3:
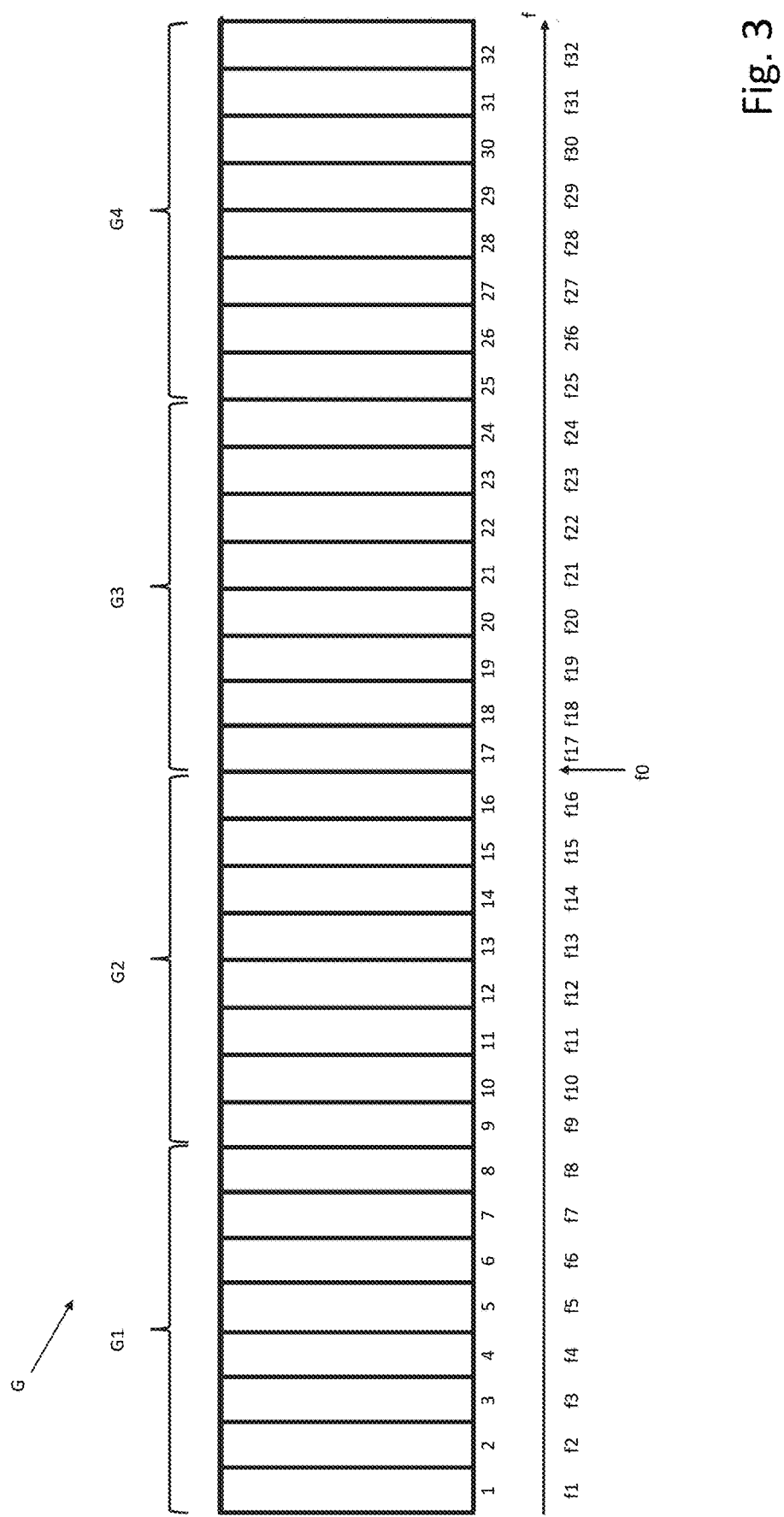
FIG. 3 shows an example of power spectral density plot consistent with an aspect of the present disclosure.

FIG. 3 illustrates a power spectral density plot of a group G of optical subcarriers, which, in this example, includes optical subcarriers 1 to 32. Optical subcarrier group G may be output from hub node 110 and may include subgroups of optical subcarriers G1 to G2. In the example, shown in FIG. 3, each subcarrier subgroup G1 to G2 includes an equal number of optical subcarriers, namely, eight. It is understood, however, that each optical subcarrier subgroup may include more or fewer optical subcarriers. Moreover, although four subgroups are shown in FIG. 3. It is further understood that more or fewer subgroups may be output from hub node 110.

Subcarriers 1-32, in one example, are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Each optical subcarrier 1-32 has a respective one of a plurality of optical frequencies f1 to f32 distributed about a center frequency f0, which is associated with the frequency of light output from a laser (discussed in greater detail below) that is modulated to provide the group of subcarriers G. In the example shown in FIG. 3, sixteen optical subcarriers 1-16 have frequencies less than frequency f0 and sixteen optical subcarriers 17-32 have optical frequencies greater than f0. It is understood, however, that more or fewer optical subcarrier frequencies may be provided above or below frequency f0.

Consistent with an aspect of the present disclosure, under certain circumstances transmission of each optical subcarrier may be undesirable. In one example, as described in greater detail below, the bandwidth or spectrum associated with frequencies f1 to f32 may exceed that of a filter through which optical subcarriers 1-32 are to pass. Accordingly, certain subcarriers may need to be blocked or not transmitted while the transmitted optical subcarriers have frequencies within the bandwidth of the filter. In another example, the data capacity of a leaf node may be insufficient to receive the data associated with a particular number of subcarriers. Rather, the leaf node may have a limited capacity to receive and process optical subcarriers, such that a relative low number of optical subcarriers may be designated for such node. Accordingly, in this example, certain subcarriers may be block while a limited number of optical subcarriers may be transmitted to the leaf node.

Figure 4A:
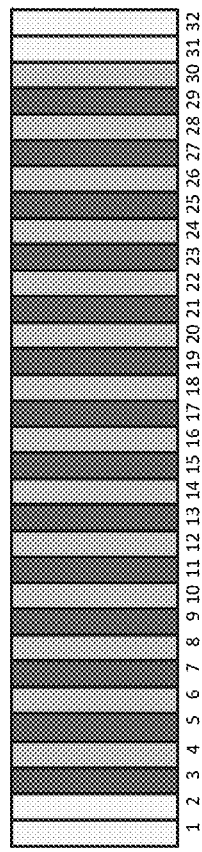
FIGS. 4a and 4b show further examples of spectral density plots consistent with the present disclosure.
Figure 4B:
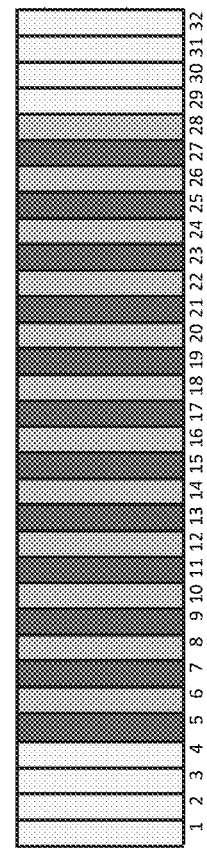

FIG. 4a shows a power spectral density plot whereby certain optical subcarriers, for example, optical subcarriers 1, 2, 31, and 32 are blocked or deactivated, whereas remaining subcarriers 3-30 are transmitted from hub 110. In FIG. 4b, optical subcarriers 1-4 and 29-32 are blocked, while remaining subcarriers 5-28 are transmitted from hub 110.

As noted above, leaf nodes 112 are often not equidistant to hub node 110. For example, some leaf nodes 112 may be significantly closer to hub node 110 than other leaf nodes 112. Moreover, the distance between each leaf node 112 and hub node 110 may have an associated optimum SE that is different than that corresponding to common modulation formats, such as QPSK and m-QAM. Accordingly, consistent with the present disclosure probabilistic shaping is employed to optimize the SE for a given link. In probabilistic shaping, the signal space is encoded such that the distribution of the projection of the n-D constellation on each of the real and the imaginary dimensions of the constellation follows a desired probability distribution, which may be Gaussian. Probabilistic shaping may be realized by encoding the input information data bits such that, when mapped to a specific 2-D constellation, the probability of occurrence of each of the constellation points follows a desired probability distribution. In other words, unlike standard modulation formats, in which symbols associated with each constellation point are transmitted with equal probability, in probabilistic shaping, certain symbols associated with particular constellation points are transmitted more frequently, i.e., have a higher likelihood or probability of transmission, compared to other symbols corresponding to other constellation points. It has been shown that probabilistic constellation shaping may be able to recover the shaping gain that is lost when standard uniform modulation formats are deployed.

A given spectral efficiency (SE) may be associated with a specific probability distribution for a corresponding constellation. Thus, different SEs may be obtained by changing the probability distribution. This is equivalent to designing a single circuit to accommodate many different modulation formats to approximate the Shannon capacity limit for a given link. Thus, in addition to improved SNR gain, probabilistic constellation shaping provides a mechanism to finely tune the SE to maximize the transmission data rate over a communication link at a fixed desired SNR margin.

Figure 5A:
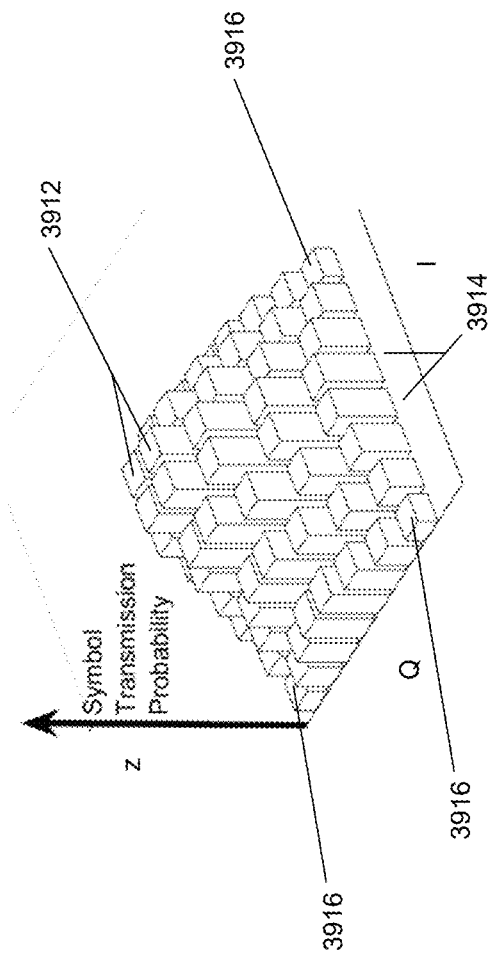
FIGS. 5a and 5b shows example of probabilistic shaping distributions consistent with the present disclosure.

FIG. 5a illustrates a three-dimensional histogram plot of a Gaussian probability distribution 3910 (P=2) in which symbols may be transmitted in accordance with an 8 QAM modulation format. The probabilities conform to a Gaussian distribution. Here, symbol transmission probability is shown on the z axis. Inner constellation points in an IQ plane (defined by I and Q axis) are represented by bars 3912, outer constellation points are represented by bars 3914, and outermost constellation points 3916 are represented by bars 3916. As further shown in FIG. 5a, symbols corresponding to inner constellation points are transmitted with a higher probability than symbols corresponding to outer constellation points, and, further, symbols corresponding to the outermost constellation points are transmitted less frequently (lower probability) than symbols corresponding to the outer and inner constellation points.

Figure 5B:
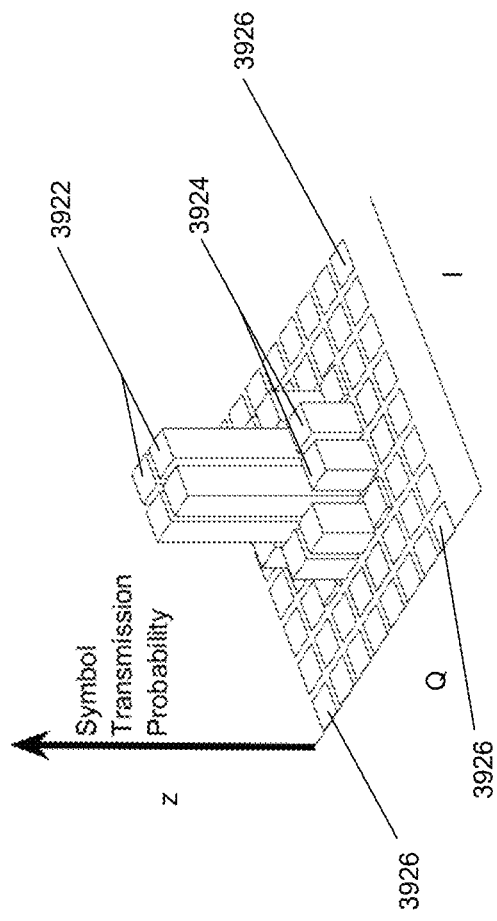

FIG. 5b shows a three-dimensional histogram plot of a super Gaussian distribution 3920 (P>2, for example) in which symbols may be transmitted in accordance with an 8 QAM modulation format. The probabilities conform to a super Gaussian distribution. Here, inner constellation points in an IQ plane (defined by I and Q axis shown in FIG. 5a) are represented by bars 3922, outer constellation points are represented by bars 3924, and outermost constellation points bars 3926. As further shown in FIG. 5b, symbols corresponding to inner constellation points are transmitted with a higher probability than symbols corresponding to outer constellation points, and, further, symbols corresponding to the outermost constellation points are transmitted less frequently (lower probability) than symbols corresponding to the outer and inner constellation points shown in FIG. 5a.

As noted above, in the distribution shown in FIG. 5a outer symbols (points) 3916 are transmitted with a greater probability than outer symbols 3926 in FIG. 5B. Accordingly, the distribution shown in FIG. 5a has an associated SE that is higher than that in FIG. 5b. However, the distribution shown in FIG. 5a may have a higher SNR at longer transmission distances than the SNR associated with the distribution shown in FIG. 5b. Accordingly, higher SE probabilistic shaping distributions, such as that shown in FIG. 5a, may be employed for transmission of optical subcarriers to leaf nodes 112 that are located a relatively short distance away from the hub 110. On the other hand, lower SE probabilistic shaping distributions, such as that shown in FIG. 5b, may be employed for transmission of optical subcarrier to leaf nodes 112 that are located a relatively long distance away from hub 11. Such lower SEs are less susceptible to SNR and are therefore more suitable for longer distance transmission.

Figure 6:
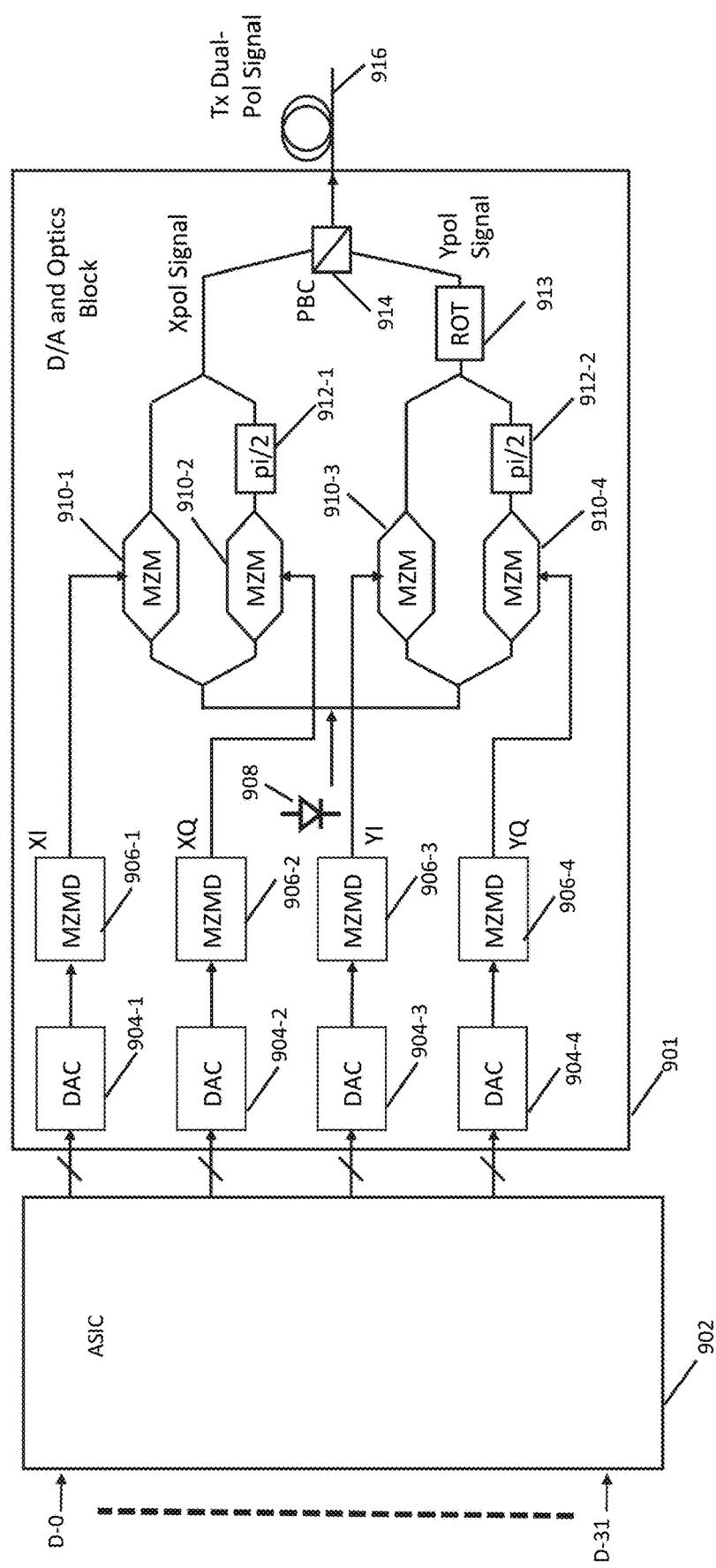
FIG. 6 shows an example of a transmitter consistent with the present disclosure.

FIG. 6 illustrates transmitter 202 of primary node 110 in greater detail. Transmitter 202 includes, for example, an application specific integrated circuit (ASIC) 902 that receives data inputs D-0 to D-31. It is understood that ASIC 902 may have more or fewer data inputs. In addition, transmitter 202 includes a D/A and optics block 901. ASIC 902 supplies a plurality of outputs to D/A and optics block 901 including digital-to-analog conversion (DAC) circuits 904-1 to 904-4, which convert digital signal received from ASIC 902 into corresponding analog signals. D/A and optics block 901 also includes driver circuits 906-1 to 906-2 that receive the analog signals from DACs 904-1 to 904-4 and adjust the voltages or other characteristics of the analog signal to provide drive signals to a corresponding one of modulators 910-1 to 910-4.

D/A and optics block 901 further includes modulators 910-1 to 910-4, each of which may be, for example, a Mach-Zehnder modulator (MZM) that modulates the phase and/or amplitude of the light output from laser 908. As further shown in FIG. 6, light output from laser 908, also included in block 901, is split such that a first portion of the light is supplied to a first MZM pairing, including MZMs 910-1 and 910-2, and a second portion of the light is supplied to a second MZM pairing, including MZMs 910-3 and 910-4. The first portion of the light is split further into third and fourth portions, such that the third portion is modulated by MZM 910-1 to provide an in-phase (I) component of an X (or TE) polarization component of a modulated optical signal, and the fourth portion is modulated by MZM 910-2 and fed to phase shifter 912-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 910-3 to provide an I component of a Y (or TM) polarization component of the modulated optical signal, and the sixth portion is modulated by MZM 910-4 and fed to phase shifter 912-2 to shift the phase of such light by 90 degrees to provide a Q component of the Y polarization component of the modulated optical signal.

The optical outputs of MZMs 910-1 and 910-2 are combined to provide an X polarized optical signal including I and Q components and are fed to a polarization beam combiner (PBC) 914 provided in block 901. In addition, the outputs of MZMs 910-3 and 910-4 are combined to provide an optical signal that is fed to polarization rotator 913, further provided in block 901, that rotates the polarization of such optical signal to provide a modulated optical signal having a Y (or TM) polarization. The Y polarized modulated optical signal also is provided to PBC 914, which combines the X and Y polarized modulated optical signals to provide a polarization multiplexed ("dual-pol") modulated optical signal onto optical fiber 916, for example, which may be included as a segment of optical fiber in optical communication path 111.

The polarization multiplexed optical signal output from D/A and optics block 401 includes, in one example, optical subcarriers 1-32 noted above, such that each subcarrier has X and Y polarization components and I and Q components. Moreover, each subcarrier 1-32 may be associated with or corresponds to a respective one of inputs D-0 to D-31. In another example, fewer than 32 optical subcarriers may be output from the hub transmitter, such as in FIGS. 4a and 4b.

Figure 7:
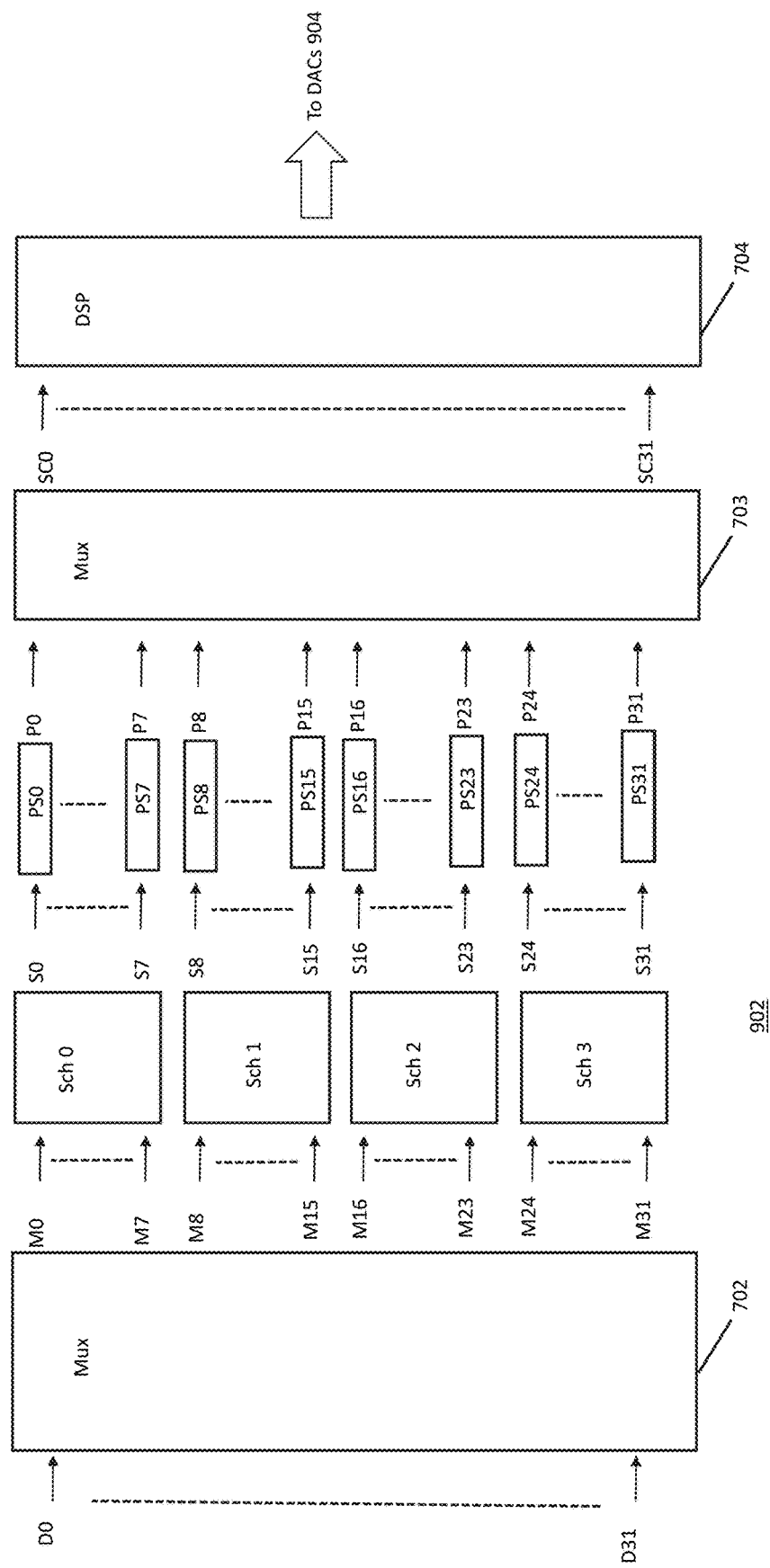
FIG. 7 shows a block diagram of an application specific integrated circuit (ASIC) consistent with the present disclosure.

FIG. 7 shows a block diagram of ASIC 902. ASIC 902 includes a multiplexer 702 which directs or allocates the data provided to inputs to a corresponding one of multiplexer outputs M0 to M31. For example, data provided to input D-0 may be supplied to output M31. In another example, the data at input D-0 is supplied to more than one of multiplexer outputs M0 to M31. If fewer inputs supply data to multiplexer 702, the data provided at such inputs may be allocated to a corresponding one of outputs M0 to M31. In another example, data present on one or more of inputs D-0 to D-31 is allocated to one or more of outputs M0 to M31.

As further shown in FIG. 7, groups of multiplexer outputs M0 to M31 are provided to a respective one of scheduler circuits Sch 0 to Sch 3. In the example shown in FIG. 7, multiplexer outputs M0 to M7 are provided to scheduler circuit Sch 0; multiplexer outputs M8 to M15 are provided to scheduler circuit Sch 1; multiplexer outputs M16 to M23 are provided to scheduler circuit Sch 3; and multiplexer outputs M24 to M31 are provided to scheduler circuit Sch 3. Scheduler circuits are operable to supply outputs S0 to S31 including the data included in inputs D-0 to D-31 to corresponding probabilistic shaping (PS) encoders PS0 to PS31. Scheduler circuits are further operable to distribute the data to one or more PS encoders PS0 to PS31, such as those described in U.S. Patent Application Publication No. 2022-0014300 the entire contents of which are incorporated herein by reference. Other known PS encoders may also be employed.

Each PS encoder PS0 to PS31 is associated with a respective optical subcarrier that is ultimately output from the modulators described above. If fewer than 32 optical subcarriers are transmitted, only the PS encoders PS0 to PS31 associated with a transmitted subcarrier may be activated, in one example. Each of PS encoders PS0 to PS31, if activated, outputs a respective one of encoded outputs to a multiplexer 703, which, in turn, has outputs SC0 to SC31, each of which corresponding to a respective one of optical subcarriers 1-32. In one example, encoded data output from one or more of PS encoders PS0 to PS31 is allocated by multiplexer 703 to one or more outputs SC0 to SC31.

Figure 8:
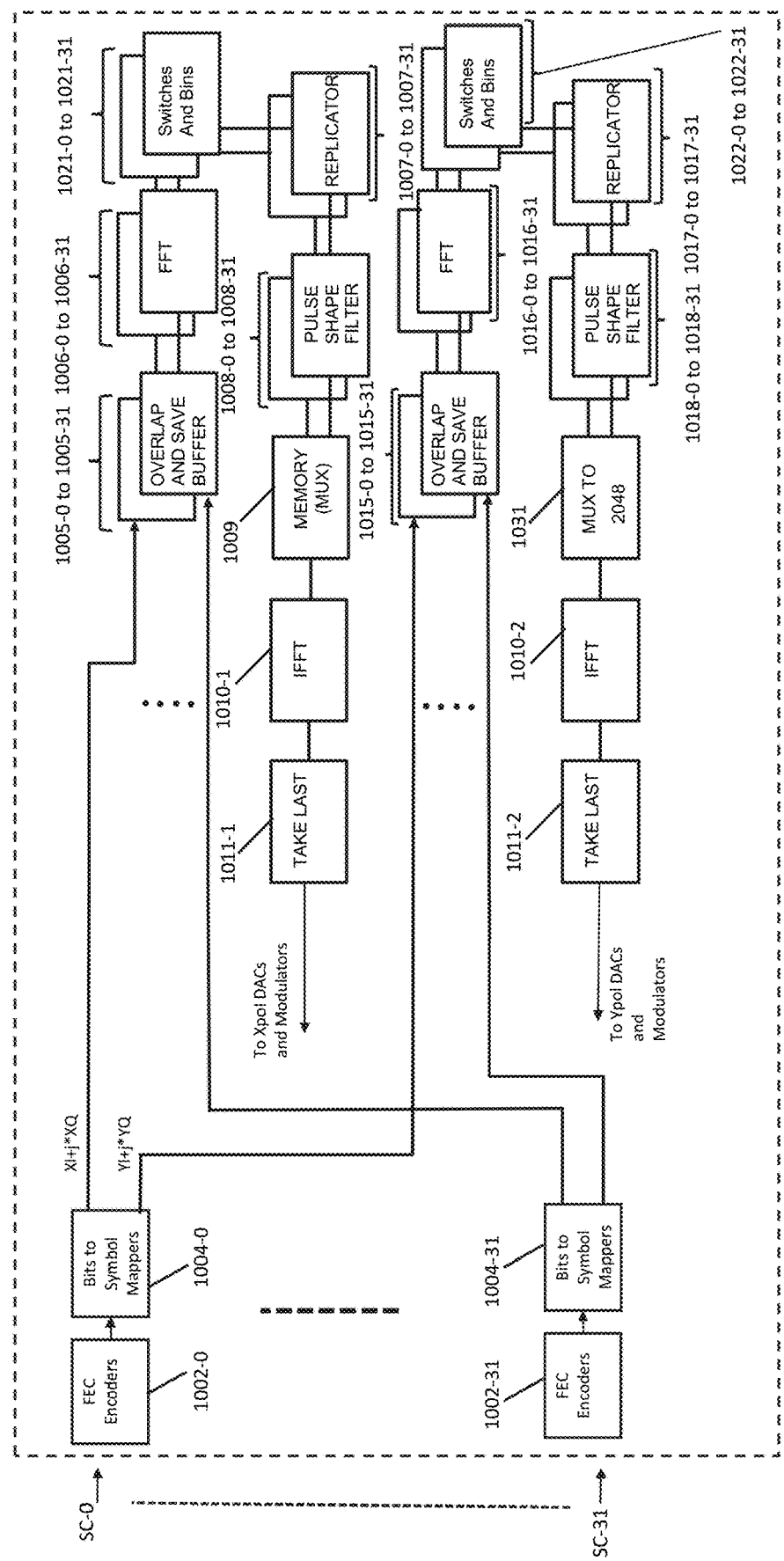
FIG. 8 shows a block diagram of a digital signal processor (DSP) consistent with the present disclosure.

As further shown in FIG. 7, outputs SC0 to SC31 are next provided to DSP 704, which is shown in greater detail in FIG. 8.

DSP 704 may include FEC encoders 1002-0 to 1002-31, each of which may receive a respective one of a plurality of the outputs from switches SW0 to SW19. FEC encoders 1002-0 to 1002-31 carry out forward error correction coding on a corresponding one of the switch outputs, such as, by adding parity bits to the received data. FEC encoders 1002-0 to 1002-31 may also provide timing skew between the subcarriers to correct for skew induced by link between nodes 110 and 112-j to 112-m described above. In addition, FEC encoders 1002-0 to 1002-31 may interleave the received data.

Each of FEC encoders 1002-0 to 1002-31 provides an output to a corresponding one of a plurality of bits-to-symbol circuits, 1004-0 to 1004-31 (collectively referred to herein as "1004"). Each of bits-to-symbol circuits 1004 may map the encoded bits to symbols on a complex plane. For example, bits-to-symbol circuits 1004 may map encoded bits described above to a distribution of symbols consistent with probabilistic shaping. Each of bits-to-symbol circuits 1004 provides first symbols, having the complex representation XI+j*XQ, associated with a respective one of the switch outputs, such as D-0, to DSP portion 1003. Data indicative of such first symbols is carried by the X polarization component of each subcarrier 1 to 32 or each transmitted subcarrier.

Each of bits-to-symbol circuits 1004 further may provide second symbols having the complex representation YI+j*YQ. Data indicative of such second symbols, however, is carried by the Y polarization component of each of subcarriers 1 to 32.

Such mapping, as carried by about circuit 1004-0 to 1004-31 define, in one example, based on the encoded data, a distribution, as described above having an associated SE optimized for a particular hub-leaf link. Accordingly, consistent with an aspect of the present disclosure one or more of the optical subcarriers may carry data at the same or a different data or baud rate than one or more of the other optical subcarriers in accordance with the distribution associated with that subcarrier.

In addition, circuits 1004 may further be operable to tailor the distribution, based on the encoded data, to result in an optimized SE and baud and/or data rate for a particular hub-leaf link.

As further shown in FIG. 8, each of the first symbols output from each of bits-to-symbol circuits 1004 is supplied to a respective one of first overlap and save buffers 1005-0 to 1005-31 (collectively referred to herein as overlap and save buffers 1005) that may buffer 256 symbols, for example. Each of overlap and save buffers 1005 may receive some of the first symbols or another number of such symbols at a time from a corresponding one of bits to symbol circuits 1004. Thus, overlap and save buffers 1005 may combine new symbols from bits to symbol circuits 1005, with the previous symbols received from bits to symbol circuits 1005.

Each overlap and save buffer 1005 supplies an output, which is in the time domain, to a corresponding one of fast Fourier Transform (FFT) circuits 1006-0 to 1006-31 (collectively referred to as "FFTs 1006"). Each of FFTs 1006 converts the received symbols to the frequency domain using or based on, for example, a fast Fourier transform. Each of FFTs 1006 may provide the frequency domain data to bins and switches blocks 1021-0 to 1021-31. As discussed in greater detail below, bins and switches blocks 1021 include, for example, memories or registers, also referred to as frequency bins (FB) or points, that store frequency components associated with each subcarrier SC.

Figure 9:
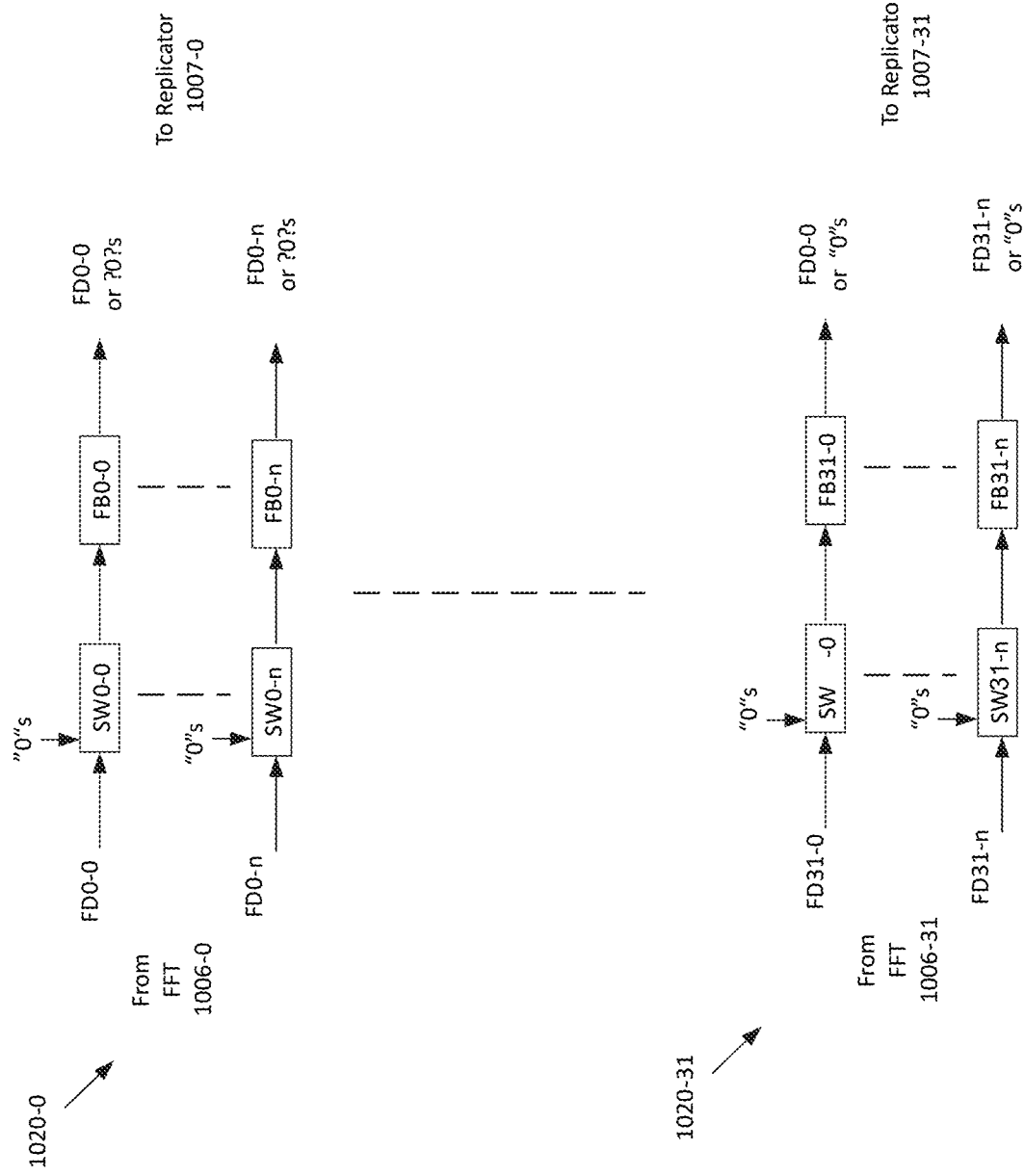
FIGS. 9 and 10 show example of circuitry provided in the DSP shown in FIG. 8.

Selected frequency bins FB are shown in FIG. 9. Groups of such frequency bins FB are associated with corresponding subcarriers. Accordingly, for example, a first group of frequency bins, FB0-0 to FB0-n, is associated with subcarrier 1 and a second group of frequency bins FB19-0 to FB19-n with subcarrier 31 (where n is a positive integer). As further shown in FIG. 9, each of frequency bins FB is further coupled to a respective one of switches SW. For example, each of frequency bins FB0-0 to FB0-n is coupled to a respective one of switches SW0-0 to SW0-n, and each of FB31-0 to FB31-n is coupled to a respective one of switches or switch circuits SW31-0 to SW31-n.

Each switch SW selectively supplies either frequency domain data output from one of FFT circuits 1006-0 to 1006-31 or a predetermined value, such as 0. In order to block or eliminate transmission of a particular subcarrier, the switches SW associated with the group of frequency bins FB associated with that subcarrier are configured to supply the zero value to corresponding frequency bins. Accordingly, for example, in order to block subcarrier 1, switches SW0-0' to SW0-n' supply zero (0) values to a respective one of frequency bins FB0-0 to FB0-n. Further processing, as described below, of the zero (0) values by replicator components 1007 as well as other components and circuits in DSP 704 result in drive signals supplied to modulators 910, such that subcarrier 1 is omitted from the optical output from the modulators.

On the other hand, switches SW may be configured to supply the outputs of FFTs 1006, i.e., frequency domain data FD, to corresponding frequency bins FB. Further processing of the contents of frequency bins FB by replicator components 1007 and other circuits in DSP 704 result in drive signals supplied to modulators 910, whereby, based on such drive signals, optical subcarriers are generated that correspond to the frequency bin groupings associated with that subcarrier.

In the example discussed above, switches SW0-0' to SW0-n' supply frequency domain data FD0-0 to FD-n from FFT 1006-0 to a respective one of switches SW0-0 to SW0-n. These switches, in turn, supply the frequency domain data to a respective one of frequency bins FB0-0 to FB0-n for further processing, as described in greater detail below.

Each of replicator components or circuits 1007-0 to 1007-31 may replicate the contents of the frequency bins FB and store such contents (e.g., for T/2 based filtering of the subcarrier) in a respective one of the plurality of replicator components. Such replication may increase the sample rate. In addition, replicator components or circuits 1007-0 to 1007-31 may arrange or align the contents of the frequency bins to fall within the bandwidths associated with pulse shaped filter circuits 1008-0 to 1008-31 described below.

Each of pulse shape filter circuits 1008-0 to 1008-31 may apply a pulse shaping filter to the data stored in the 512 frequency bins of a respective one of the plurality of replicator components or circuits 1007-0 to 1007-31 to thereby provide a respective one of a plurality of filtered outputs, which are multiplexed and subject to an inverse FFT, as described below. Pulse shape filter circuits 1008-1 to 1008-31 calculate the transitions between the symbols and the desired subcarrier spectrum so that the subcarriers can be packed together spectrally for transmission, e.g., with a close frequency separation. Pulse shape filter circuits 1008-0 to 1008-31 also may be used to introduce timing skew between the subcarriers to correct for timing skew induced by links between nodes shown in FIG. 1, for example. Multiplexer component 1009, which may include a multiplexer circuit or memory, may receive the filtered outputs from pulse shape filter circuits 1008-0 to 1008-31, and multiplex or combine such outputs together to form an element vector.

Next, IFFT circuit or component 1010-1 may receive the element vector and provide a corresponding time domain signal or data based on an inverse fast Fourier transform (IFFT). In one example, the time domain signal may have a rate of 64 GSample/s. Take last buffer or memory circuit 1011-1, for example, may select the last 1024 samples, or another number of samples, from an output of IFFT component or circuit 1010-1 and supply the samples to DACs 904-1 and 904-2 (see FIG. 9) at 64 GSample/s, for example. As noted above, DAC 904-1 is associated with the in-phase (I) component of the X pol signal, and DAC 904-2 is associated with the quadrature (Q) component of the Y pol signal. Accordingly, consistent with the complex representation XI+jXQ, DAC 904-1 receives values associated with XI and DAC 904-2 receives values associated with jXQ. As indicated by FIG. 9, based on these inputs, DACs 904-1 and 904-2 provide analog outputs to MZMD 906-1 and MZMD 906-2, respectively, as discussed above.

As further shown in FIG. 9, each of bits-to-symbol circuits 1004-0 to 1004-31 outputs a corresponding one of symbols indicative of data carried by the Y polarization component of the polarization multiplexed modulated optical signal output on fiber 916. As further noted above, these symbols may have the complex representation YI+j*YQ. Each such symbol may be processed by a respective one of overlap and save buffers 1015-0 to 1015-31, a respective one of FFT circuits 1016-0 to 1016-31, a respective one of replicator components or circuits 1017-0 to 517-31, pulse shape filter circuits 1018-0 to 1018-31, multiplexer or memory 1019, IFFT 1010-2, and take last buffer or memory circuit 1011-2, to provide processed symbols having the representation YI+j*YQ in a manner similar to or the same as that discussed above in generating processed symbols XI+j*XQ output from take last circuit 1011-1. In addition, symbol components YI and YQ are provided to DACs 904-3 and 904-4 (FIG. 9), respectively. Based on these inputs, DACs 904-3 and 904-4 provide analog outputs to MZMD 906-3 and MZMD 906-4, respectively, as discussed above.

While FIG. 9 shows DSP 704 as including a particular number and arrangement of functional components, in some implementations, DSP 704 may include additional functional components, fewer functional components, different functional components, or differently arranged functional components. In addition, typically the number of overlap and save buffers, FFTs, replicator circuits, and pulse shape filters associated with the X component may be equal to the number of switch outputs, and the number of such circuits associated with the Y component may also be equal to the number of switch outputs. However, in other examples, the number of switch outputs may be different from the number of these circuits.

As noted above, based on the outputs of MZMDs 906-1 to 906-4, a plurality of optical subcarriers SC0 to SC19 may be output onto optical fiber 916 (FIG. 9), which is coupled to the primary node 110.

Consistent with an aspect of the present disclosure, the number of subcarriers transmitted from primary node 110 to secondary nodes 112 may vary over time based, for example, on capacity requirements at the primary node and the secondary nodes. For example, if less downstream capacity is required initially at one or more of the secondary nodes, transmitter 202 in primary node 110 may be configured to output fewer optical subcarriers. On the other hand, if further capacity is required later, transmitter 202 may provide more optical subcarriers.

In addition, if based on changing capacity requirements, a particular secondary node 112 needs to be adjusted, for example, the output capacity of such secondary node may be increased or decreased by, in a corresponding manner, increasing or decreasing the number of optical subcarriers output from the secondary node.

As noted above, by storing and subsequently processing zeros (0s) or other predetermined values in frequency bin FB groupings associated with a given subcarrier SC, that subcarrier may be removed or eliminated. To add or reinstate such subcarrier, frequency domain data output from the FFTs 1006 may be stored in frequency bins FB and subsequently processed to provide the corresponding subcarrier.

Thus, subcarriers may be selectively added or removed from the optical outputs of primary node transmitter 202 and secondary node transmitter 304, such that the number of subcarriers output from such transmitters may be varied, as desired.

In the above example, zeros (0s) or other predetermined values are stored in selected frequency bins FBs to prevent transmission of a particular subcarrier SC. Such zeroes or values may, instead, be provided, for example, in a manner similar to that described above, at the outputs of corresponding replicator components 1007 or stored in corresponding locations in memory or multiplexer 1009. Alternatively, the zeroes or values noted above may be provided, for example, in a manner similar to that described above, at corresponding outputs of pulse shape filters 1008.

Figure 10:
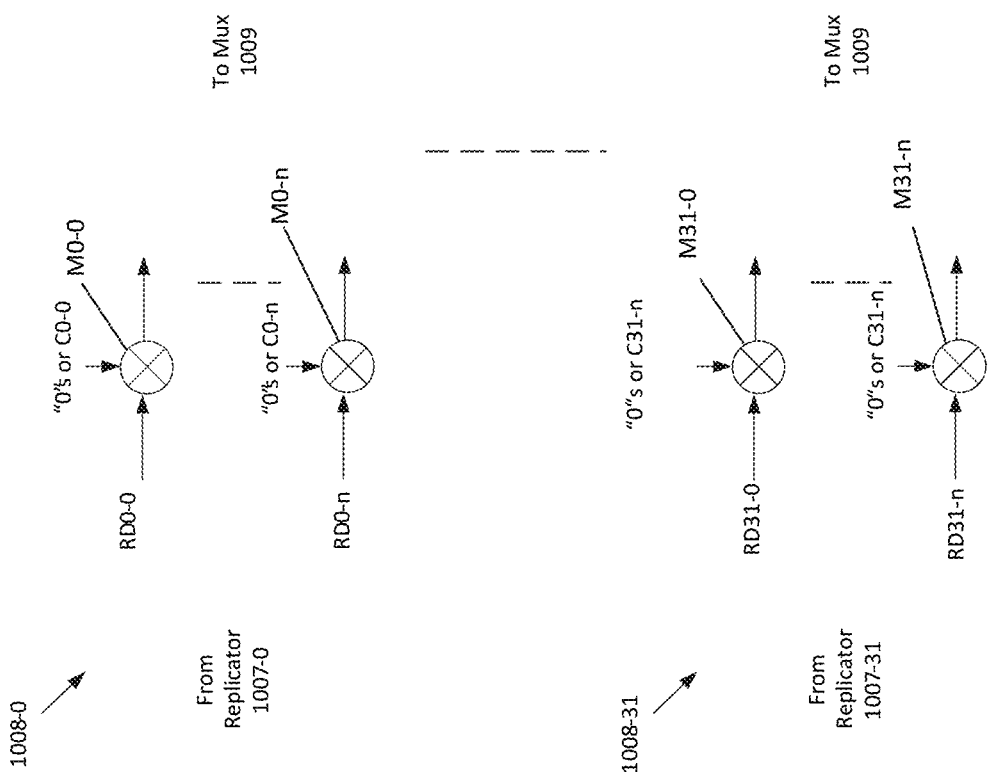

In a further example, a corresponding one of pulse shape filters 1008-1 to 1008-31 may selectively generate zeroes or predetermined values that, when further processed, also cause one or more subcarriers to be omitted from the output of either primary node transmitter 202. In particular, as shown in FIG. 10, pulse shape filters 1008-0 to 1008-31 are shown as including groups of multiplier circuits M0-0 to M0-$n$ ... M19-0 to M19-$n$ (also individually or collectively referred to as M). Each multiplier circuit M constitutes part of a corresponding butterfly filter. In addition, each multiplier circuit grouping is associated with a corresponding one of subcarriers SC.

Each multiplier circuit M receives a corresponding one of output groupings RDO-0 to RDO-n ... RD31-0 to RD31-$n$ from replicator components 1007. In order to remove or eliminate one of subcarriers SC, multiplier circuits M receiving the outputs within a particular grouping associated with that subcarrier multiply such outputs by zero (0), such that each multiplier M within that group generates a product equal to zero (0). The zero products then are subject to further processing similar to that described above to provide drive signals to modulators 910 that result in a corresponding subcarrier SC being omitted from the output of the transmitter (either transmitter 202 or 304).

On the other hand, in order to provide a subcarrier SC, each of the multiplier circuits M within a particular groping may multiply a corresponding one of replicator outputs RD by a respective one of coefficients C0-0 to C0-$n$ ... C31-0 to C31-$n$, which results in at least some non-zero products being output. Based on the products output from the corresponding multiplier grouping, drive signals are provided to modulators 910 to output the desired subcarrier or subcarriers from the transmitter 202.

Accordingly, for example, in order to block or eliminate subcarrier 1, each of multiplier circuits M0-0 to M0-$n$ (associated with subcarrier 1) multiplies a respective one of replicator outputs RDO-0 to RDO-n by zero (0). Each such multiplier circuit, therefore, provides a product equal to zero, which is further processed, as noted above, such that resulting drive signals cause modulators 910 to provide an optical output without subcarrier 1. In order to reinstate 1, multiplier circuits M0-0 to M0-$n$ multiply a corresponding one of appropriate coefficients C0-0 to C0-$n$ by a respective one of replicator outputs RDO-0 to RDO-n to provide products, at least some of which are non-zero. Based on these products, as noted above, modulator drive signals are generated that result in subcarrier 1 being output.

The above examples are described in connection with generating or removing the X component of a subcarrier. The processes and circuitry described above is employed or included in DSP 704 and optical circuitry used to generate the Y component of the subcarrier to be blocked. For example, switches and bins circuit blocks 1022-0 to 1022-31, have a similar structure and operate in a similar manner as switches and bins circuit blocks 1021 described above to provide zeroes or frequency domain data as the case may be to selectively block the Y component of one or more subcarriers SC. Alternatively, multiplier circuits, like those described above in connection with FIG. 10 may be provided to supply zero products output from selected pulse shape filters 1018 in order to block the Y component of a particular subcarrier or, if non-zero coefficients are provided to the multiplier circuits instead, generate the subcarrier.

Thus, the above examples illustrate mechanisms by which subcarriers SC may be selectively blocked from or added to the output of transmitter 202. Since, as discussed below, DSPs and optical circuitry provided in secondary node transmitters are similar to that of primary node transmitter 202, the processes and circuitry described above is provided, for example, in the secondary node transmitters to selectively add and remove subcarriers from the outputs of the secondary node transmitters. Moreover, consistent with the present disclosure, the circuitry described above in connection with FIGS. 9 and/or 10 may be configured so that a first number of optical subcarriers are output from the transmitter (in either the primary node 110 or the secondary node 112) during a first period of time based on initial capacity requirements. Later, during a second period of time, a second number of optical subcarriers can be output from the hub and/or leaf transmitters based on capacity requirements different than the first capacity requirements.

Thus, as noted above, the number of subcarriers output from the hub node as well the probabilistic shaping of each subcarrier can be adjusted based on capacity requirements a leaf node and the distance of that leaf node from the hub.

Figure 11:
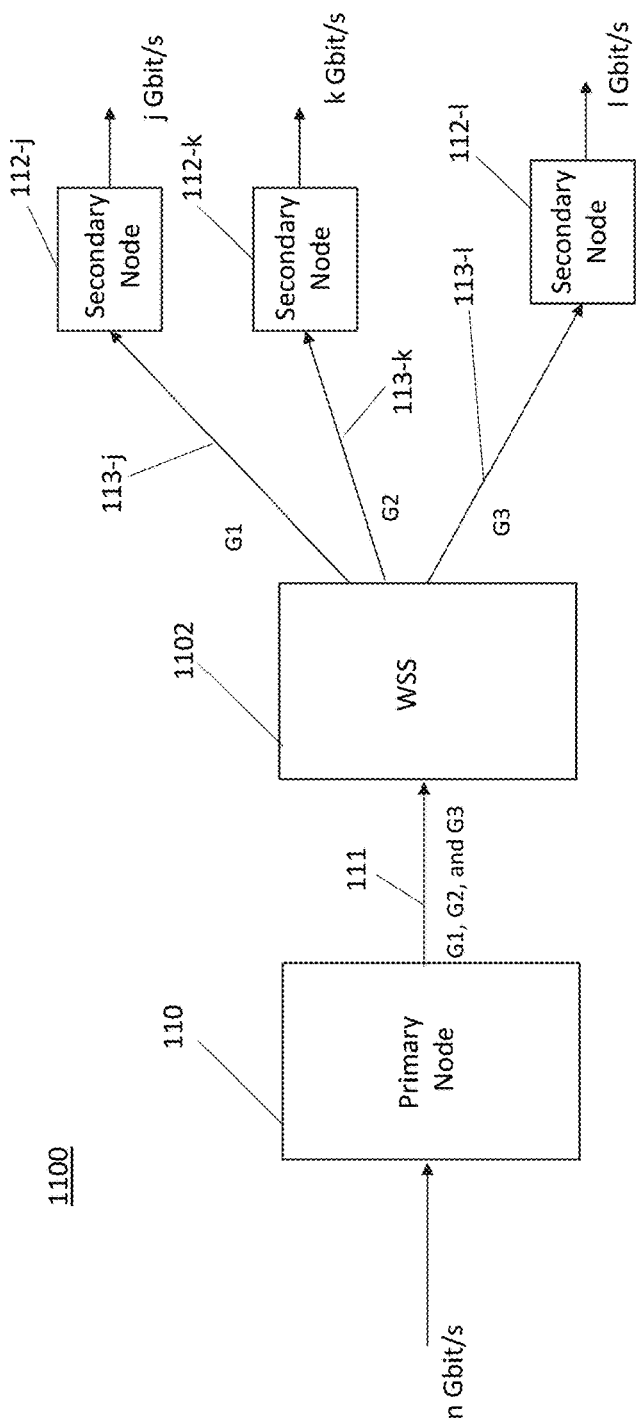
FIG. 11 shows an example of a network consistent with a further aspect of the present disclosure.

FIG. 11 shows another example of an optical communication network 1100 consistent with the present disclosure. Optical communication system 1100 is similar to network 100 described above. In network 1100, however, splitter 114 is replaced with a wavelength selective switch (WSS) 1102.

Figure 12:
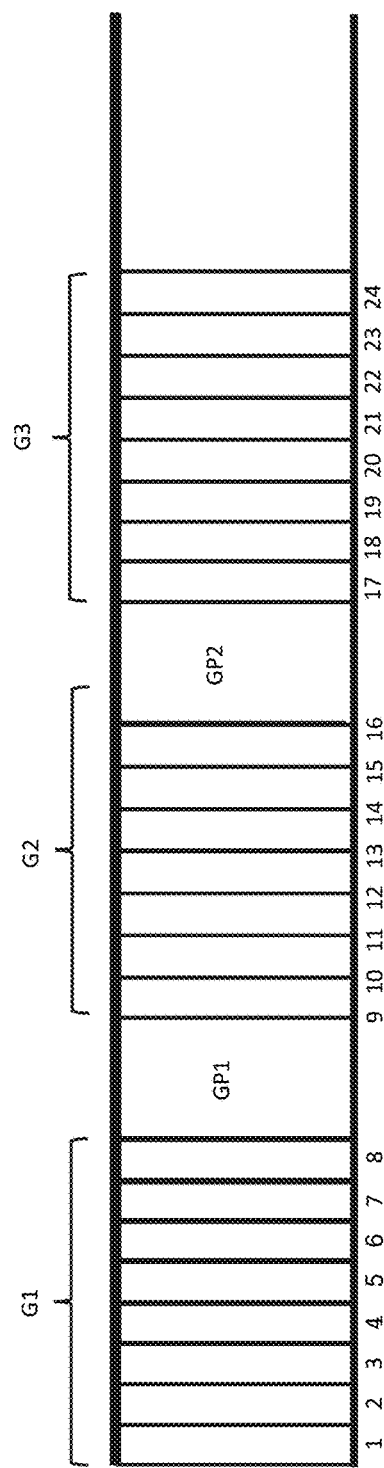
FIG. 12 a power spectral density plot showing subgroups of optical subcarriers consistent with the present disclosure.

Moreover, in the example shown in FIG. 11, three groups of optical subcarriers, G1, G2, and G3 (see FIG. 12) are provided to WSS 1102 from primary or hub node 110. As shown in FIG. 12, which is a power spectral density plot showing subgroups of optical subcarriers, subgroup G1 includes optical subcarriers 1-8, subgroup G2 includes optical subcarriers 9-17, and subgroup G3 includes optical subcarriers 18-24. As further shown in FIG. 12, a spectral or frequency gap GP1 separates subcarrier 8 (the subcarrier having the highest frequency in subgroup G1) from subcarrier 9 (the subcarrier having the lowest frequency in subgroup G2). In addition, a second spectral or frequency gap GP2 separates subcarrier 16 (the subcarrier having the high frequency in subgroup G2) from subcarrier 17 (the subcarrier having the lowest frequency in subgroup G3). Accordingly, subgroup G1 is spectrally separated from subgroup G2 and subgroup G2 is further spectrally separated from subgroup G3. Frequency gaps, such as gaps GP1 and GP2 may be beneficial to spectrally confine subcarriers to within passbands of filters included in the WSS. If subcarriers were provided in the gaps, such subcarriers would be outside the passband and may therefore be substantially attenuated. Thus, preferably, the gaps cause the frequencies of the transmitted subcarriers to fall within the passbands of the WSS filters.

Consistent with a further aspect of the present disclosure, each of secondary nodes 112-$j$ to 112-1 may have different capacity requirements and may be located a different distance from hub node 110. With system described herein, however, the capacity and SE may be tailored for optimal performance. For example, assuming the capacity of node 112-*j* 300 Gbit/s, node 112-*k* is 100 Gbit/s, and node 112-*l* is 20 Gbit/s. Moreover, assuming that the hub capacity is 800 Gbit/s, and each subcarrier has a maximum capacity of 25 Gbit/s, 12 subcarriers may be allocated to node 112-*j*. Moreover, if node 112-*j* is located relatively far from primary node 110, a probabilistic shaping distribution may be selected with a lower SE. In that case, additional subcarriers may be transmitted to node 112-*j* such that the aggregate capacity of the subcarriers transmitted to this node equals 300 Gbits. Thus, the present disclosure provides flexibility of bandwidth and flexibility of reach for optical subcarriers transmitted from the hub node to the leaf node.

In a further example, leaf node 112-1 may have a capacity requirement of 15 Gbit/s. If this node is relatively far away from the hub, two subcarriers may be transmitted to the leaf node, each with a low SE and associated probabilistic shaped distribution whereby the outer symbols are transmitted with a lower probability. On the other hand, if the node is close to the hub, a higher SE may be provided with a different distribution whereby the outer symbols are transmitted with a higher probability, i.e., the symbols are transmitted more frequently. In that case, one subcarrier may be transmitted to the leaf node. As noted above, the present disclosure also provides for selectively activating and deactivating subcarriers to accommodate different leaf node capacity requirements, for example.

Figure 13:
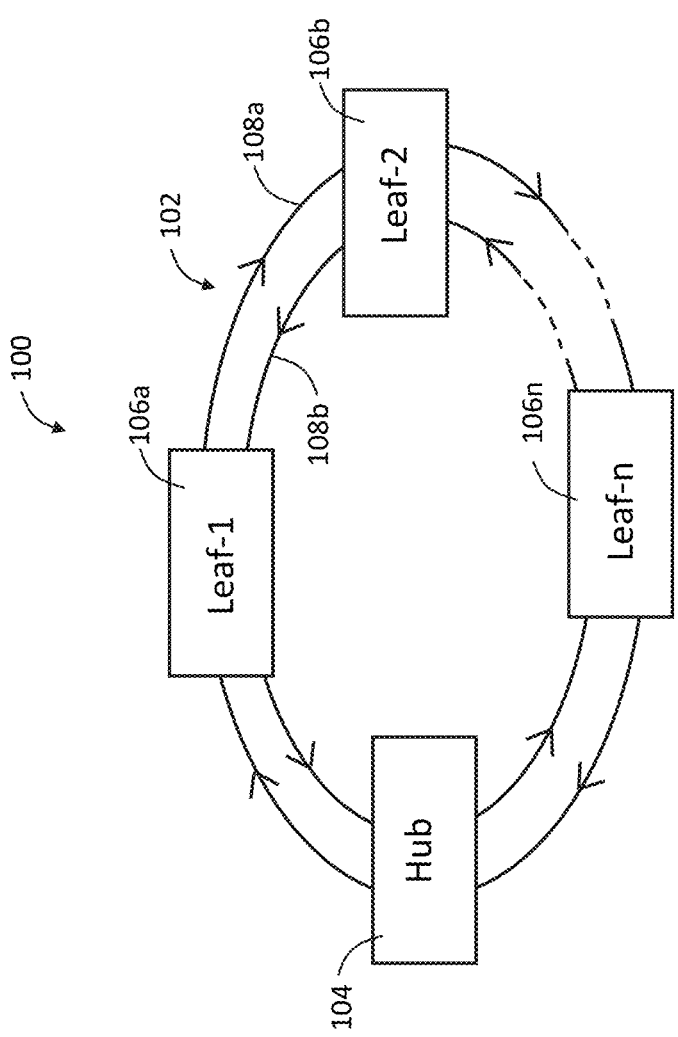
FIG. 13 shows an example optical communications network consistent with a further aspect of the present disclosure.

FIG. 13 shows an example optical communications network 100 consistent with a further aspect of the present disclosure. The optical communications network 100 includes multiple network nodes that are communicatively coupled to one another by an access ring 102.

In this example, the network nodes include a hub node 104 ("Hub") and N leaf nodes 106a-106n ("Leaf-1," "Leaf-2," . . . "Leaf-n"). Each of the network nodes can include one or more respective computer devices (e.g., server computers, client computers, etc.). In some implementations, the network nodes can be configured such that the hub node 104 transmits and/or receives data from each of the leaf nodes 106a-106n. For example, the hub node 104 can receive data (e.g., from another network node) that is intended for one of the leaf nodes 106a-106n, and route the data to that leaf node 106a-106n. As another example, a leaf node 106a-106n can generate data that is intended for another network device, and route the data to the hub node 104 for delivery to the intended network device. Although a single hub node 104, this is merely an illustrative example. In practice, an optical communications network can include any number of hub nodes. Similarly, an optical communications network can include any number of leaf nodes.

As shown in FIG. 13, the network nodes are communicatively coupled to one another using an access ring 102. In this example, the access ring 102 includes two optical paths 108a and 108b (which may also be referred to as optical communication paths). The first optical path 108a communicatively couples the hub node 104 and the leaf nodes 106a-106n in a sequence in a first direction (e.g., a clockwise direction). The second optical path 108b communicatively couples the hub node 104 and the leaf nodes 106a-106n in a sequence in a second direction (e.g., a counterclockwise direction). Each of the optical paths 108a and 108b can be implemented using one or more optical links (e.g., optical fiber) and/or equipment interconnecting the optical links (e.g., line system components).

In the example shown in FIG. 13, hub node 104 is configured to supply a first group of optical subcarriers to optical path 108a via at least one WSS provided in the hub. In addition, hub node 104 is configured to supply a second group of optical subcarriers to optical path 108b via another WSS or the same WSS, as discussed in greater detail below with reference to FIG. 14.

During an example data transmission operation of the hub node 104, a Tx processor 450 of the hub node 104 receives optical data D1 to D8 (intended for the leaf nodes 106a-106h, respectively) using an optical signal processor (DSP) 402. The data D1 to D8 is transmitted from the DSP 402 to an optical to analog converter (D/A) 404 (which also may be referred to as a digital-to-analog conversion circuitry). The D/A 404 converts the optical data into corresponding analog signal. The analog signals are provided to a laser driver 406 (which may also be referred to as driver circuitry). The driver 406 generates optical signals based on the analog signals. The generated optical signals are provided to a modulator 408, which modulates the optical signal with a carrier optical signal output by a laser 410 and an optical splitter 412. As an example, the modulated optical signal can include data modulated according to each of the optical subcarriers SC1 to SC16.

The modulated optical signal is provided to an optical splitter 414, which splits the modulated optical signal between two wavelength selective switches (WSSes) 416a and 416b (e.g., splits the modulated optical signal, such that the power of the optical signal is split among the WSSes 416a and 416b). The WSS 416a selects wavelengths of the modulated optical signal corresponding to a subset of the optical subcarriers (e.g., the optical subcarriers SC1-SC8), and injects the selected wavelengths of the modulated optical signal into the first optical signal path 108a (e.g., the "hub working Tx" path). The other WSS 416b selects wavelengths of the modulated optical signal corresponding to the other subset of the optical subcarriers (e.g., the optical subcarriers SC9-SC16), and injects the selected wavelengths of the modulated optical signal into the second optical signal path 108b (e.g., the "hub protect Tx" path).

During an example data receipt operation of the hub node 104, the hub node 104 receives a first optical signal from the first optical path 108a (e.g., the "hub protect Rx" path) using a WSS 416c, and receives a second optical signal from the second optical path 108b (e.g., the "hub working Tx" path) using a WSS 416d. The first optical signal can include, for example, a first instance of data D1'-D8' transmitted by the leaf nodes 106a-106h, respectively. Further, the second optical signal can include a second instance of the data D1'-D8' transmitted by the leaf nodes 106a-106h, respectively. The WSS 416c selects wavelengths of the first optical signal corresponding to a subset of the optical subcarriers (e.g., the optical subcarriers SC9'-SC16'), and provides the selected wavelengths to an optical combiner 420. Similarly, the WSS 416d selects wavelengths of the second optical signal corresponding to another subset of the optical subcarriers (e.g., the optical subcarriers SC1'-SC8'), and provides the selected wavelengths to the optical combiner 418.

The optical combiner 418 combines the selected wavelengths of light, and provides the combined wavelengths of light to receiver Rx, which, in turn, proves the received optical subcarriers and provides data D1' to D16'.

Figure 14:
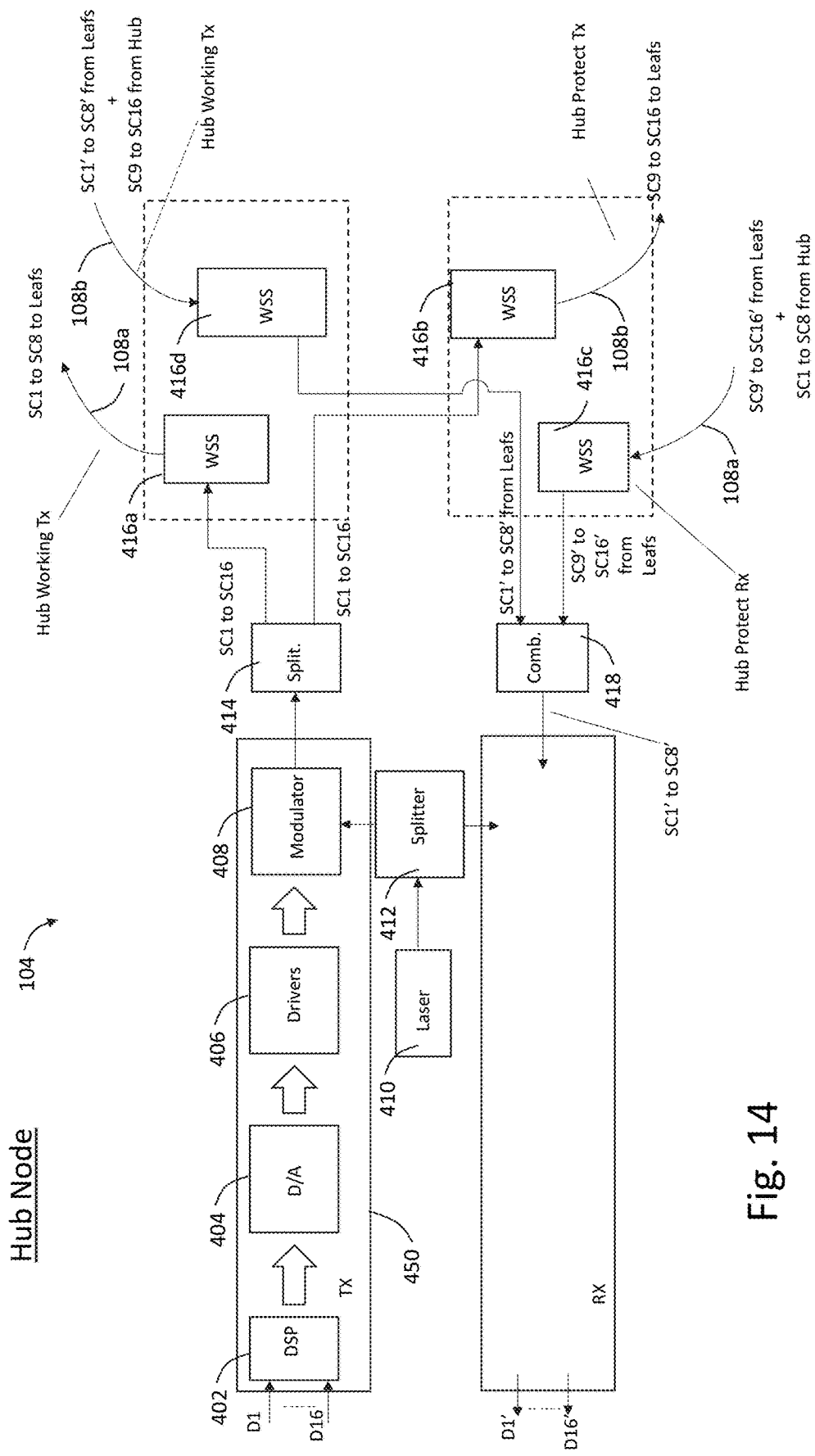
FIG. 14 shows a block diagram of a hub node included in the network shown in FIG. 13.

Although FIG. 14 shows an example hub node 104 having four WSSes 416a-416d, in some implementations, a hub node 104 can include a fewer number of WSSes. For example, referring to FIG. 4B, a hub node 104 can include two WSSes 416e and 416f. The WSS 416e can be configured to select wavelengths of light for transmission using the optical path 108a, and to select wavelengths of light received from the optical path 108b. The WSS 416f can be configured to select wavelengths of light for transmission using the optical path 108b, and to select wavelengths of light received from the optical path 108a.

As described above, during normal operation (e.g., when both the first optical path 108a and the second optical path 108b are intact and do not have any malfunctioning optical links or equipment), each of the leaf nodes 106a-106h can recover the respective data D1-D8 from the optical signal received from the first optical path 108a (e.g., by demodulating the optical signal received over that optical path, in particular the optical subcarrier that was assigned to or allotted to that leaf node). For example, the leaf node 106a can recover the data D1, the leaf node 106b can recover the data D2, and so forth. Similarly, the hub node 104 can recover the data D1'-D8' from the optical signal received from the second optical path 108b (e.g., by demodulating the optical signal received over that optical path, in particular the optical subcarriers that are assigned to or allotted to each of the leaf nodes). For example, the hub node 104 can recover the data D1'-D8'.

As described above, the optical communications network 100 can be configured to mitigate the effects of severed and/or malfunctioned optical links in the access ring 102.

For example, the hub node 104 can be configured to transmit multiple instances of a particular portion of data to one of the more of the leaf nodes 106a-106n concurrently using the optical paths 108a and 108b. For instance, the hub node 104 can receive data intended for each of the leaf nodes 106a-106n (e.g., eight portions of data D1-D8 intended for eight leaf nodes 106a-106h, respectively). The hub node 104 can generate a first optical signal, modulate the first optical signal based on the data D1-D8 (e.g., using respective optical subcarriers assigned to or allotted to the leaf nodes 106a-106h), and transmit the first optical signal over the first optical path 108a. With reference to this data transmission, the first optical path 108a may be referred to as the "hub working Tx" path or the "leaf working Rx" path.

Further, the hub node 104 can generate a second optical signal, modulate the second optical signal based on the data D1-D8 (e.g., using respective optical subcarriers assigned to or allotted to the leaf nodes 106a-106h), and transmit the second optical signal over the second optical path 108b, concurrently with the transmission of the first optical signal over the optical path 108a. With reference to this data transmission, the second optical path 108b may be referred to as the "hub protect Tx" path or the "leaf protect Rx" path.

In some implementations, the information transmitted by the hub node 104 along the first optical path 108a can be identical to the information transmitted by the hub node 104 along the second optical path 108b.

In some implementations, the information transmitted by the hub node 104 along the first optical path 108a can be different from the information transmitted by the hub node 104 along the second optical path 108b. For example, the first information and the second information can include the same data modulated according to different digital subcarriers (e.g., as described above). As another example, the first information and the second information can include the same data transmitted according to different forward error correction (FEC) schemes (e.g., by including different FEC codes or bits). For instance, as shown in FIG. 2A, the length of the first optical path 108a from the hub node 104 to the leaf node 106b (e.g., 60 km) can be different from the length of the second optical path 108b from the hub node 104 and to leaf node 106b (40 km). Due to this difference, the hub node 104 can transmit data intended to the second leaf 106b according to different FEC schemes (e.g., by including different FEC codes or bits), depending on the optical path this is used.

During normal operation (e.g., when both the first optical path 108a and the second optical path 108b are intact and do not have any malfunctioning optical links or equipment), each of the leaf nodes 106a-106h can recover the respective data D1-D8 from the optical signal received from the first optical link path 108a (e.g., by demodulating the optical signal received over that optical path, in particular the optical subcarrier that was assigned to or allotted to that leaf node). For example, referring to FIG. 2A, the leaf node 106a can recover the data D1, the leaf node 106b can recover the data D2, and so forth.

However, if the first optical path 108a includes severed or malfunctioning optical links or equipment, each of the leaf nodes 106a-106h can recover the respective data D1-D8 from the optical signal received from the second optical path link 108b (e.g., by demodulating the optical signal received over that optical path, in particular the optical subcarrier that was assigned to or allotted to that leaf node. Accordingly, the connectivity between the hub node 104 and each of the leaf network 106a-106n can be maintained, despite malfunctioning optical links or equipment.

Further, each of the leaf nodes 106a-106n also can be configured to transmit multiple instances of a particular portion of data to the hub node 104 concurrently using the optical paths 108a and 108b. For instance, each of the leaf nodes 106a-106n can receive respective data D1'-D8' intended for the hub node 104. Each of the leaf nodes 106a-106n can generate a first optical signal, modulate the first optical signal based on a respective one of the data D1'-D8' (e.g., using respective optical subcarriers assigned to or allotted to the leaf nodes 106a-106n), and transmit the first optical signal over the second optical path 108b. With reference to this data transmission, the second optical path 108b may be referred to as the "leaf working Tx" path or the "hub working Rx" path.

Further, each of the leaf nodes 106a-106n can generate a second optical signal, modulate the second optical signal based on a respective one of the data D1'-D8' (e.g., using respective optical subcarriers assigned to or allotted to the leaf nodes 106a-106n), and transmit the second optical signal over the first optical path 108a, concurrently with the transmission of the first optical signal over the second optical path 108b. With reference to this data transmission, the first optical path 108a may be referred to as the "leaf protect Tx" path or the "hub protect Rx" path.

Similarly, in some implementations, the information transmitted by a leaf node 106a-106h along the first optical path 108a can be identical to the information transmitted by the leaf node 106a-106n along the second optical path 108b.

In some implementations, the information transmitted by a leaf node 106a-106h along the first optical path 108 can be different from the information transmitted by the leaf node 106a-106h along the second optical path 108b. For example, the first information and the second information can include the same data modulated according to different digital subcarriers (e.g., as described above). As another example, the first information and the second information can include the same data transmitted according to different forward error correction (FEC) schemes (e.g., by including different FEC codes or bits). For instance, the length of the first optical path 108a from the leaf node 106b to the hub node 104 (e.g., 40 km) can be different from the length of the second optical path 108b from the leaf node 106b to the hub node 104 (60 km). Due to this difference, the leaf node 106b can transmit data intended to the hub node 104 according to different FEC schemes (e.g., by including different FEC codes or bits), depending on the optical path this is used.

Similarly, during normal operation (e.g., when both the first optical path 108a and the second optical path 108b are intact and do not have any malfunctioning optical links or equipment), the hub node 104 can recover the data D1'-D8' from the optical signal received from the second optical path link 108b (e.g., by demodulating the optical signal received over that optical path, in particular the optical subcarriers that are assigned to or allotted to each of the leaf nodes). For example, referring to FIG. 2A, the hub node 104 can recover the data D1'-D8'.

However, if the second optical path 108b includes severed or malfunctioning optical links or equipment, the hub node 104 can recover the data D1'-D8' from the optical signal received from the first optical path link 108a (e.g., by demodulating the optical signal received over that optical path, in particular the optical subcarriers that are assigned to or allotted to each of the leaf nodes). Accordingly, the connectivity between the hub node 104 and each of the leaf network 106a-106n can be maintained, despite malfunctioning optical links or equipment.

Consistent with a further aspect of the present disclosure, optical subcarriers transmitted from hub node 104 to more distant leaf nodes 106 may have an associated distribution, as described above, and corresponding probabilistic shaping such that a corresponding SE associated with such optical subcarrier is relatively low (see, for example, FIG. 5b). Optical subcarriers transmitted to leaf nodes 106 that are located closer to the hub node may have a relatively higher SE based on probabilistic shaping and distribution wherein outer symbols are transmitted more frequently. See, for example, FIG. 5b.

Figure 15:
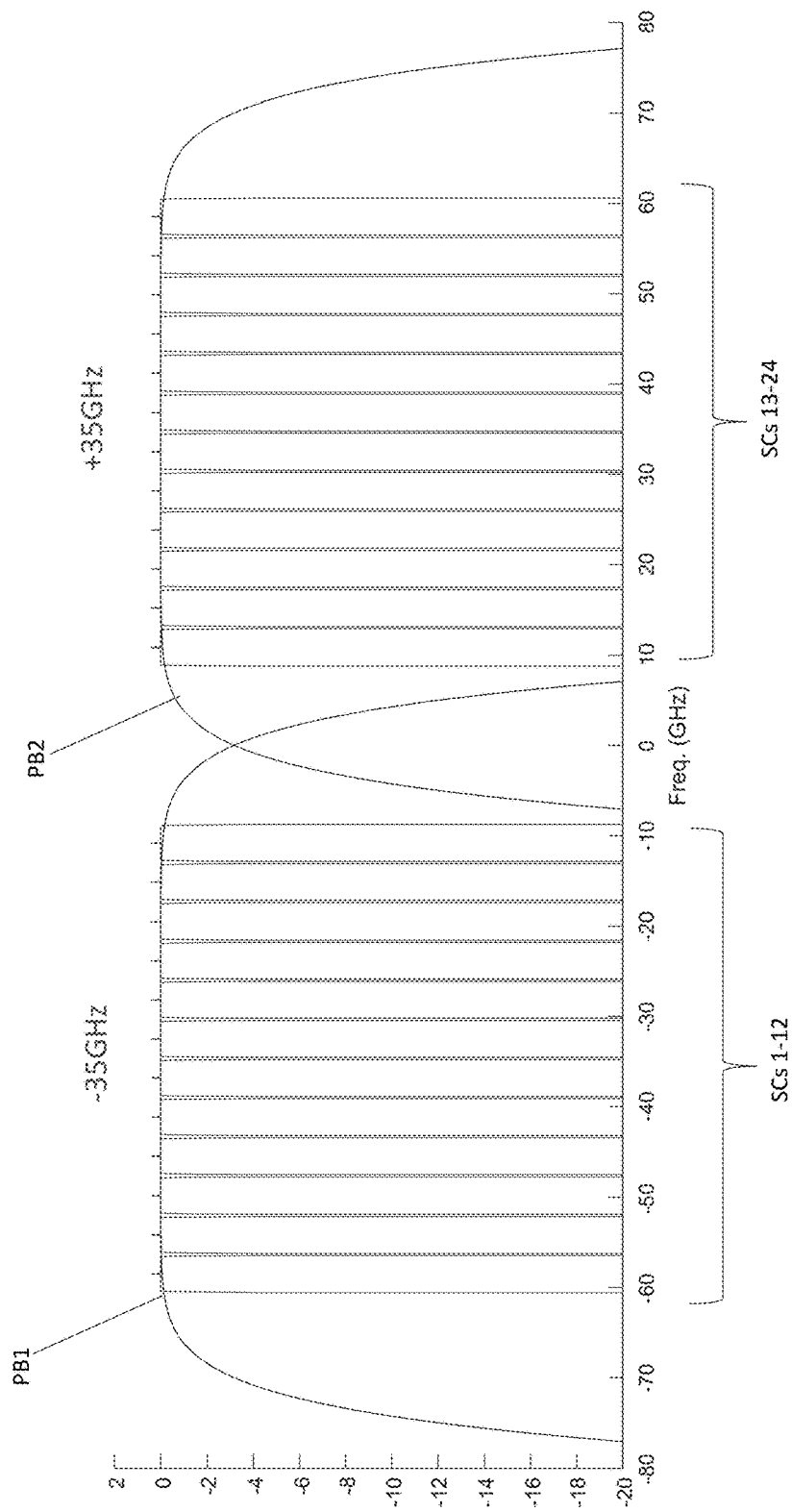
FIG. 15 shows optical subcarriers and wavelength selective switch filter passbands consistent with a further aspect of the present disclosure.

FIG. 15 shows examples of WSS filter passbands PB1 and PB2 consistent with a further aspect of the present disclosure. As shown in FIG. 15, passband PB1 encompasses frequencies associated with subcarriers SC1 to SC12, and passband PB2 encompasses frequencies associated with subcarriers SC13 to SC24. No subcarriers are transmitted within the gap that is four subcarrier frequencies wide, in this example. As noted above, such subcarriers would be provided outside the passbands and, therefore, would be substantially attenuated.

As noted above, one or subcarriers within each group of optical subcarriers shown in FIG. 15 may have a different probabilistic shaping that results in an optimal SE based on a distance from the hub to an associated leaf node.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
   a hub node operable to transmit a plurality of optical subcarriers, a first one of the plurality of optical subcarriers carrying first symbols and second symbols, wherein the first symbols are transmitted with a first probability and the second symbols are transmitted with a second probability less than the first probability, and a second one of the plurality of optical subcarriers carries third symbols and fourth symbols, wherein the third symbols are transmitted with a third probability and the fourth symbols are transmitted with a fourth probability less than the third probability and greater than the second probability;
   a first leaf node operable to receive the first one of the plurality of optical subcarriers; and
   a second leaf node operable to receive the second one of the plurality of optical subcarriers, the first leaf node being configured to be located a first distance from the hub node and the second leaf node being configured to be located a second distance from the hub node, the first distance being greater than the second distance.

2. An apparatus in accordance with claim 1, wherein each of the plurality of optical subcarriers is a Nyquist subcarrier.

3. An apparatus in accordance with claim 1, further including a wavelength selective switch operable to direct the first one of the optical subcarriers to the first leaf node and the second one of the optical subcarriers to the second leaf node.

4. An apparatus in accordance with claim 3, wherein the wavelength selective switch has associated first and second passbands, the first one of the plurality of optical subcarriers has a first frequency within the first passband and the second one of the plurality of optical subcarriers has a second frequency within the second passband.

5. An apparatus in accordance with claim 1, wherein the first one of the plurality of optical subcarriers is one of a first subgroup of optical subcarriers and the second one of the plurality of optical subcarriers is one of a second subgroup of optical subcarriers.

6. An apparatus in accordance with claim 1, further comprising an optical communication path that at least in part communicatively connects the hub node to each of the first leaf node and the second leaf node, wherein the hub node is operable to transmit the plurality of optical subcarriers onto the optical communication path.

7. An apparatus, comprising:
   a hub node operable to transmit, onto an optical communication path of a point-to-multipoint optical communication system, a first one of a plurality of optical subcarriers and a second one of the plurality of optical subcarriers, the first one of the plurality of optical subcarriers carrying first symbols and second symbols, wherein the first symbols are transmitted with a first probability and the second symbols are transmitted with a second probability less than the first probability, and the second one of the plurality of optical subcarriers carrying third symbols and fourth symbols, wherein the third symbols are transmitted with a third probability and the fourth symbols are transmitted with a fourth probability that is less than the third probability and greater than the second probability;
   a first leaf node operable to receive the first one of the plurality of optical subcarriers;
   a second leaf node operable to receive the second one of the plurality of optical subcarriers; and
   wherein the first leaf node is located a first distance from the hub node and the second leaf node is located a second distance from the hub node, the first distance being greater than the second distance.

8. A method of transmission, comprising the steps of:
   transmitting, from a hub node onto an optical communication path of a point-to- multipoint optical communication system, a first one of a plurality of optical subcarriers carrying first symbols and second symbols, wherein the first symbols are transmitted with a first probability and the second symbols are transmitted with a second probability less than the first probability;
   transmitting, from the hub node onto the optical communication path of the point-to-multipoint optical communication system, a second one of the plurality of optical subcarriers carrying third symbols and fourth symbols, wherein the third symbols are transmitted with a third probability and the fourth symbols are transmitted with a fourth probability that is less than the third probability and greater than the second probability;

receiving the first one of the plurality of optical subcarriers at a first leaf node of the point-to-multipoint optical communication system;

receiving the second one of the plurality of optical subcarriers at a second leaf node of the point-to-multipoint optical communication system; and wherein the first leaf node is located a first distance from the hub node and the second leaf node is located a second distance from the hub node, the first distance being greater than the second distance.

* * * * *